Oct. 19, 1937.          W. B. MOORE ET AL          2,096,127
                            COFFEE MAKER
                        Filed April 22, 1937

INVENTORS.
Walter B. Moore.
Robert S. Cobb.
BY
ATTORNEYS.

Patented Oct. 19, 1937

2,096,127

UNITED STATES PATENT OFFICE 2,096,127

COFFEE MAKER

Walter B. Moore and Robert S. Cobb, West Lafayette, Ohio, assignors to The Moore Enameling & Manufacturing Company, West Lafayette, Ohio, a corporation of Ohio Application April 22, 1937, Serial No. 138,383

3 Claims. (Cl. 53—3)

Our invention relates to a coffee maker. It has to do, more particularly, with a device adapted to be used for making coffee by the French drip method.

There have been many coffee makers of the general type indicated devised in the past. Most of these prior art coffee makers have been made of a number of parts which are difficult to keep clean. It has been found that those coffee makers which are provided with filter paper make the best coffee, it being free of all solid matter and, consequently, very clear. However, in the prior art devices using filter papers, it has been necessary to provide means for clamping the filter paper in position. This complicates the structure of the coffee makers and makes them difficult to use. Another disadvantage of such prior art coffee makers has resided in the fact that the grounds work beneath the filter paper and ultimately reach the container which receives the coffee beverage.

One of the objects of our invention is to provide a coffee maker for making coffee by the French drip method which is of a very simple structure, being composed of a small number of parts, and being so constructed that it is easy to keep clean.

Another object of our invention is to provide a coffee making device of the type indicated which employs filter papers for insuring that the coffee will be clear and free from all solid matter.

Another object of our invention is to provide a coffee maker of the type indicated wherein filter papers are adapted to be used but which is of such a nature that it will not be necessary to provide means for clamping the filter paper in position thereby greatly simplifying the use of the coffee making device.

Another object of our invention is to provide a coffee making device of the type indicated which is of such a nature that even though the filter papers are not clamped in position, there will be no tendency for the coffee grounds to work under the edge of the paper.

The preferred embodiment of our invention is illustrated in the accompanying drawing wherein similar characters of reference designate corresponding parts and wherein.

Figure 1:
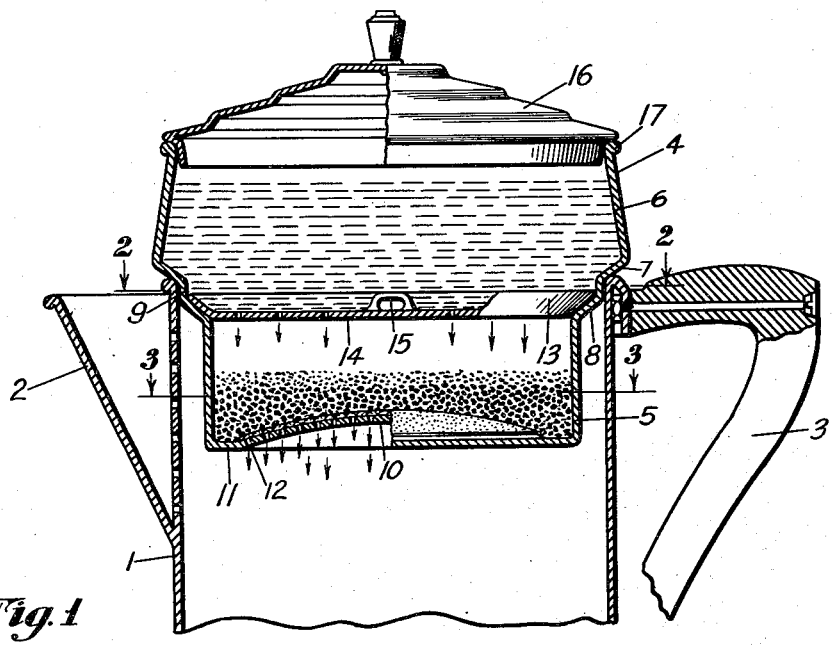
Figure 1 is a vertical section taken through a coffee making device constructed in accordance with our invention.

With reference to the drawing, and particularly to Figure 1, we have illustrated our coffee making device as comprising a main container 1 which is mainly of cylindrical form and which is adapted to receive the coffee beverage. This container 1 is provided with a pouring spout 2 adjacent its upper end and with a handle 3 located diametrically opposite thereto. The container 1 is adapted to receive another container 4 within its upper end.

The container 4 is preferably of the shape illustrated. It comprises a lower depending portion 5 which is mainly of cylindrical form. It also comprises an upper portion 6 which is near cylindrical form but has its wall tapering inwardly slightly towards its upper edge. The portion 6 is of greater diameter than the portion 5 and the two portions are connected together by an integral section embodying inclined portions 7 and 8 and a vertically disposed portion 9. It will be apparent from Figure 1 that when the member 4 is inserted in the upper end of the container 1, the portion 9 thereof will fit tightly against the inner surface of the container 1. It preferably fits sufficiently tight so that there will be no tendency for it to fall out of the container 1 when coffee is being poured from such container. The outer surface of the portion 5 is spaced from the wall of the container 1 in order to permit free passage of the coffee beverage through the spout 2.

Figure 3:
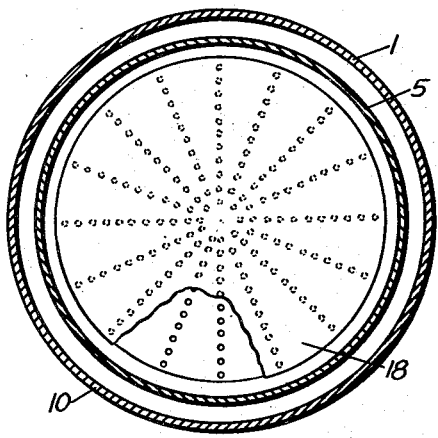
Figure 3 is a section taken substantially along the line 3—3 of Figure 1.
Figure 4:
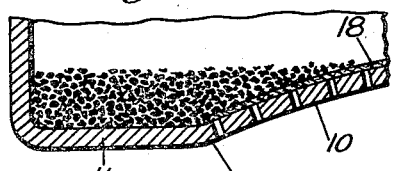
Figure 4 is a detail in section showing a filter paper in position on the strainer member through which the coffee beverage is adapted to pass.

The bottom of the portion 5 is formed by a dome-shaped member 10 which is provided with a number of perforations in the manner illustrated in Figure 3. This dome-shaped member projects upwardly within the portion 5 in which the chamber for receiving the coffee grounds is formed. The dome-shaped member 10 is connected to the lower edge of the portion 5 by means of an annular imperforate flange or shelf 11. The structure of the dome and the imperforate shelf or flange 11 is illustrated clearly in Figure 4. It will be noted that the perforations in the member 10 extend downwardly only to a point indicated by the numeral 12 which is spaced slightly from the beginning of the horizontally disposed imperforate flange or shelf 11. This dome-like structure and cooperating imperforate shelf or flange is an important feature of our invention.

Figure 2:
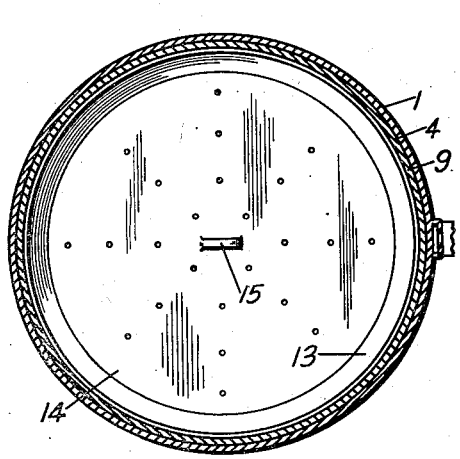
Figure 2 is a section taken substantially along the line 2—2 of Figure 1.

The portion 8 of the member 4 provides an inclined seat upon which the correspondingly inclined edge 13 of a water spreader member 14 is adapted to seat. As illustrated in Figure 2 this member 14 is provided with a number of small apertures. This member retards the flow of water into the portion 5 of the container and also serves to spread the water so that it will reach all portions of the coffee grounds. Positioning of the member 14 in the container 4 and removal therefrom is facilitated by a finger grip 15. The upper end of the container 4 is adapted to receive a lid 16 of substantially dome form which is provided with a depending flange 17 adapted to fit tightly within the upper end of the container 4.

In the use of this coffee maker it is preferable to first pour boiling water through the upper receptacle 4 allowing it to pass downwardly through the spreader member 14 and then through the strainer member 10 and finally into the main container 1 so as to warm all portions of the coffee maker. This water is then poured from the container. The dome-like member 10 will be wet and a filter paper indicated by the numeral 18 may then be placed on the upper surface of this member. Due to capillary attraction, the filter paper will be firmly held in position. The filter paper should be of such size and should be so placed on the dome-like member 10 that its outer edge will not extend downwardly over the upper surface of the imperforate flange or shelf 11. The coffee grounds are then positioned in the portion 5 of the container as indicated. Then, the spreader member 14 is positioned in the manner indicated in Figure 1. Boiling water is now poured into the upper portion 6 of the receptacle 4 and the lid 16 is positioned as indicated. Flow of this water into the receptacle formed within the portion 5 is retarded by the member 14 and the water is spread so that it will reach all portions of the coffee grounds. It finally passes through the member 14 and seeps downwardly through the coffee grounds. Then it passes through the filter paper and finally out through the apertures in the dome member 10 and drops into the container 1 from which it may be poured.

By having the dome-shaped portion 10 and the imperforate annular horizontally disposed shelf 11, any tendency for the grounds to work under the edge of the filter paper will be substantially eliminated. Furthermore, since the edge of the filter paper is free and does not contact with the wall of the portion 5, it is possible to position the filter paper on the strainer member 10 in such a manner that all wrinkles will be eliminated therefrom. It is important to have the filter paper of such size that it will not extend over the imperforate flange or shelf 11 in order to reduce the tendency for the grounds to work under the edge of the paper. When the paper terminates substantially at the point where the horizontal shelf begins, or slightly above such point, the grounds have a tendency to work downwardly away from the edge of the paper. The shelf is not perforated so that there will be a tendency for the water to flow towards the center of the strainer member 10 and so that all of the water will not tend to flow towards the side of the portion 5. It will be apparent that there will be a greater weight of coffee grounds towards the periphery of the portion 5 due to the dome-shape of member 10 and the horizontal flange 11 and, consequently, the edge of the filter paper will be held in position by the weight of the coffee grounds. The member 10 is preferably so constructed as to take standard size filter papers.

One or more filter papers may be employed. The use of more than one filter paper will produce stronger coffee since it will retard the flow of water through the coffee grounds, enabling the consumer to produce any strength of coffee desired.

It will be apparent from the above description that we have provided a coffee making device having many desirable features. It is of a very simple structure, being composed of a small number of parts and it is so constructed that it may be kept clean easily. Although filter papers are adapted to be used in our device, it is not necessary to provide means for clamping the filter paper in position and, consequently, the use of the device is greatly simplified. Furthermore, although the filter papers are not clamped in position, the device is so constructed that the coffee grounds will not tend to work under the edge of the paper.

Various other advantages will be apparent from the preceding description, the drawing and the following claims.

Having thus described our invention, what we claim is:

1. A coffee making device for making coffee by the drip method comprising a main container adapted to receive the coffee beverage, a receptacle adapted to fit within the upper end of the main container and having a portion projecting downwardly thereinto, a strainer member at the bottom of said receptacle upon which the coffee grounds are adapted to rest, said strainer member comprising a centrally disposed portion of dome-like form which is perforated and an annular horizontally disposed imperforate flange connecting the edge of the dome-like portion to the wall of said receptacle, a filter paper disposed on the upper surface of the dome-like portion and terminating substantially at the edge of the dome-like portion, a water-spreading and flow-retarding member disposed within the receptacle at a point spaced above the strainer member, and a lid for closing the upper end of said receptacle.

2. A coffee making device for making coffee by the drip method comprising a main container adapted to receive the coffee beverage, a receptacle adapted to fit within the upper end of the main container, a strainer member adjacent the bottom of said receptacle upon which the coffee grounds are adapted to rest, said strainer member comprising a centrally disposed portion of dome-like form which is perforated and an annular horizontally disposed imperforate flange connecting the edge of the dome-like portion to the wall of said receptacle, said dome-like portion being adapted to receive a filter paper on the upper surface thereof which preferably terminates substantially at the edge of the dome-like portion, and a water-spreading and flow-retarding member mounted in the receptacle at a point spaced above the strainer member.

3. A coffee making device comprising a receptacle adapted to receive the liquid which is adapted to pass through coffee grounds disposed therein, a strainer member upon which the coffee grounds are adapted to rest, said strainer member comprising a centrally disposed portion of dome-like form which is perforated and an annular horizontally disposed imperforate flange connecting the edge of the dome-like portion to the wall of said receptacle, and a filter paper disposed on the upper surface of the dome-like portion and terminating substantially at the edge thereof.

WALTER B. MOORE.
ROBERT S. COBB.